US007463145B2

(12) United States Patent
Jentoft

(10) Patent No.: US 7,463,145 B2
(45) Date of Patent: Dec. 9, 2008

(54) SECURITY MONITORING ARRANGEMENT AND METHOD USING A COMMON FIELD OF VIEW

(75) Inventor: Keith Jentoft, Circle Pines, MN (US)

(73) Assignee: RSI Video Technologies, Inc., White Bear Lake, MN (US)

( * ) Notice: Subject to any disclaimer, the term of this patent is extended or adjusted under 35 U.S.C. 154(b) by 412 days.

(21) Appl. No.: 11/388,764

(22) Filed: Mar. 24, 2006

(65) Prior Publication Data

US 2007/0063840 A1 Mar. 22, 2007

Related U.S. Application Data

(60) Provisional application No. 60/719,369, filed on Sep. 22, 2005.

(51) Int. Cl.
*G08B 13/00* (2006.01)
*G08B 19/00* (2006.01)
*H04N 7/18* (2006.01)
*G08B 1/08* (2006.01)

(52) U.S. Cl. ....................... 340/541; 340/517; 340/521; 340/522; 340/565; 340/539.17; 340/693.1; 382/103; 348/152; 348/154; 348/155

(58) Field of Classification Search ................. 340/541, 340/517, 521, 522, 565, 539.25, 693.1; 348/152, 348/154, 155
See application file for complete search history.

(56) References Cited

U.S. PATENT DOCUMENTS 4,857,912 A 8/1989 Everett, Jr. et al.
5,448,290 A 9/1995 Van Zeeland
5,703,368 A 12/1997 Tomooka et al.
5,819,124 A 10/1998 Somner et al.
6,271,752 B1 8/2001 Vaios
6,411,209 B1 6/2002 Lyons et al.
6,476,858 B1 11/2002 Ramirez Diaz et al.
6,504,479 B1 1/2003 Lemons et al.
6,690,414 B2 2/2004 Lyons et al.
6,700,487 B2 3/2004 Lyons et al.
6,759,957 B2 7/2004 Murakami et al.
2002/0171557 A1 11/2002 Wegener
2003/0065407 A1 4/2003 Johnson et al.
2003/0193563 A1 10/2003 Suzuki
2003/0202117 A1 10/2003 Garner (Continued)

FOREIGN PATENT DOCUMENTS

DE 101 50 745 A 1 4/2003

(Continued)

*Primary Examiner*—Donnie L Crosland
(74) *Attorney, Agent, or Firm*—Crawford Maunu PLLC

(57) ABSTRACT

According to one example embodiment, an integrated security arrangement detects unwanted intruders in a facility. The arrangement includes an intrusion sensor to sense an intrusion at a target area of a facility, a second sensor to sense movement, an image-capture device, and a base unit. The image-capture device captures images in response to an intrusion indication from the intrusion sensor and in response to a movement indication from the second sensor. The base unit integrates a direction of view of the second sensor and of the image-capture device, thereby directing the second sensor to sense in the target area in which the images are captured by the image-capture device.

22 Claims, 4 Drawing Sheets

U.S. PATENT DOCUMENTS

| | | | |
|---|---|---|---|
| 2004/0109059 | A1 | 6/2004 | Kawakita |
| 2004/0155781 | A1 | 8/2004 | DeOme |
| 2004/0205823 | A1 | 10/2004 | Tsai |
| 2004/0205824 | A1 | 10/2004 | Tsai |
| 2005/0024206 | A1 | 2/2005 | Samarasekera et al. |
| 2005/0134450 | A1 | 6/2005 | Kovach |
| 2005/0134454 | A1 | 6/2005 | Eskildsen |

FOREIGN PATENT DOCUMENTS

| | | | |
|---|---|---|---|
| EP | 676 733 | A | 10/1995 |
| EP | 811 959 | A | 12/1997 |
| EP | 0 856 826 | A2 | 8/1998 |
| EP | 1 115 264 | A2 | 7/2001 |
| EP | 1 363 260 | A1 | 11/2003 |
| EP | 1 499 098 | A1 | 1/2005 |
| EP | 1 316 933 | B1 | 8/2006 |
| GB | 2 325 548 | A | 11/1998 |
| GB | 2 358 504 | A | 7/2001 |
| JP | 01236397 | A | 9/1989 |
| JP | 11154292 | | 6/1999 |
| JP | 2003233889 | | 8/2003 |
| JP | 2005071064 | | 3/2005 |
| WO | WO 88/07474 | | 1/1988 |
| WO | WO 00/03367 | | 1/2000 |
| WO | WO 02/46919 | A2 | 6/2002 |
| WO | WO 2004/064355 | A2 | 7/2004 |
| WO | WO 2004/079684 | A1 | 9/2004 |
| WO | WO 2004/114648 | A2 | 12/2004 |
| WO | WO 2005/065196 | A2 | 7/2005 |

SECURITY MONITORING ARRANGEMENT AND METHOD USING A COMMON FIELD OF VIEW

RELATED PATENT DOCUMENTS

This patent document claims benefit under 35 U.S.C. § 119(e) to U.S. Provisional Patent Application No. 60/719,369, entitled "Security Monitoring Arrangement and Method with Privacy Control," filed on Sep. 22, 2005.

FIELD OF THE INVENTION

The present invention is directed to a security arrangement and method for monitoring the inside of a facility or residence.

BACKGROUND

In order to protect residents, employees, personal property, and the like, security monitoring systems are used to monitor a variety of facilities and to sense the presence of an unwanted intruder. Many such security systems are connected to a central control unit and monitored by an operator who can alert the appropriate emergency services in the event of an unwanted intruder. Typically, a home monitoring security system includes a combination of sensing devices and alarm devices and some also include cameras. To achieve the maximum monitoring coverage, these devices are distributed throughout the interior of the facility.

Security systems that employ cameras are advantageous in that they are able to record activity associated with a suspected breach of the facility. In some instances, however, the cameras record the regular activities of the facilities' residents and/or employees. The cameras also record activities that are falsely perceived to be security breaches such as pet behaviors and authorized users that have been accidentally locked out.

In specific situations, such as those having the potential to violate the privacy of authorized residents and/or employees of the facility, such comprehensive recordation by the security cameras may be undesirable. Since unwanted intruders could breach the security of a facility while the inhabitants are present, it is necessary for the security monitoring system to be functioning at all times. However, having cameras constantly being triggered to record the inhabitants' daily living and working routines is a dramatic invasion of the inhabitants' privacy, and is burdensome with respect to false triggers. Further, the monitoring and recording of guests' activities can be just as invasive.

The above-discussed issues have presented challenges to developing a home and/or facility security monitoring system that provides maximum coverage while minimizing one or more of the above-identified issues.

SUMMARY

The present invention is directed to the above and related types of integrated security systems. These and other aspects of the present invention are exemplified in a number of illustrated implementations and applications, some of which are shown in the figures and characterized in the claims section that follows.

Various aspects of the present invention are applicable to an integrated security arrangement. The arrangement includes an intrusion sensor to sense an intrusion at a target area of a facility, a second sensor to sense movement, an image-capture device, and a base unit. The image-capture device captures images in response to an intrusion indication from the intrusion sensor and in response to a movement indication from the second sensor. The base unit integrates a direction of view of the second sensor and of the image-capture device, thereby directing the second sensor to sense in the target area in which the images are captured by the image-capture device.

Other aspects of the present invention are applicable to a method for manufacturing an integrated security apparatus that is responsive to an intrusion sensor that senses an intrusion at a target area of a facility. The method includes providing a base unit, a second sensor to sense movement, and an image-capture device. The image-capture device captures images in response to both an intrusion indication from the intrusion sensor and to a movement indication from the second sensor. The method also includes securing the second sensor and the image-capture device to the base unit to integrate a direction of view of the second sensor and of the image-capture device. This integration directs the second sensor to sense in the target area in which the images are captured by the image-capture device.

Other aspects of the present invention are applicable to a security system where a second sensor and image-capture device are not physically integrated inside the same housing. In one such example, an embodiment is arranged with an intrusion sensor to sense an intrusion at a target area of a facility, a second sensor to sense movement, and an image-capture device. The second sensor bears a special relationship ( e.g., located sufficiently near and aligned) with the image-capture device to form a common field of view, such that the fields of view for both devices overlap without the devices being located inside a common housing. The image-capture device captures images in response to an intrusion indication from the intrusion sensor and in response to a movement indication from the second sensor.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1A:
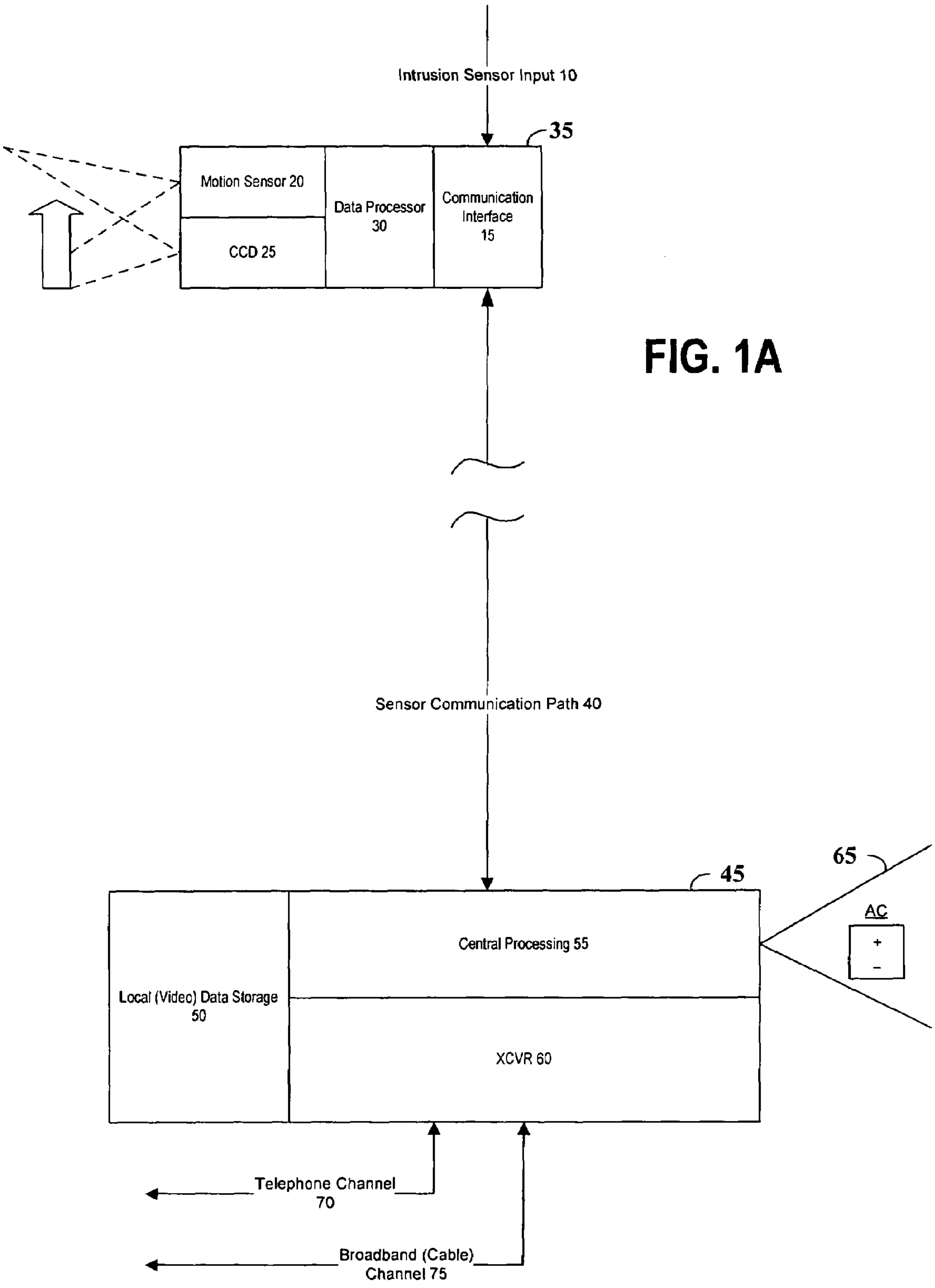
FIG. 1A illustrates an integrated security system, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different approaches and arrangements for providing security services. The invention has been found to be particularly advantageous for addressing security monitoring needs in a residence or private-office environment.

According to an example embodiment, a security system utilizes cameras to detect and identify intruders. The system includes an integrated camera/motion detector that is responsive to intrusion conditions. The camera's smart-behavior results in reduced power consumption and mitigates privacy concerns on various levels. A system user sets up zones with at least one intrusion sensor (e.g., door/window contacts or glass-break detectors) for each zone around the perimeter of a facility and sets up corresponding camera/motion detectors in the interior of the facility. The intrusion sensors are activated (armed) by a system user, using, e.g., a keypad on a security panel, a remote control fob, or a phone call with DTMF. This allows for a complete activation of the system when the system user leaves the facility as well as a partial perimeter activation of the facility when the system user (or other authorized person) is present. Thus, when the user is present the camera remains "off" unless appropriately triggered by the motion detector. However, the motion detector also remains "off" unless it is armed by a corresponding intrusion sensor. Therefore, cameras record images inside the facility when both an intrusion sensor has been tripped and a motion detector has detected motion.

Another example embodiment is directed to an integrated security arrangement. The arrangement includes an intrusion sensor to sense an intrusion at a target area of a facility, a second sensor to sense movement, an image-capture device, and a base unit. The image-capture device captures images in response to an intrusion indication from the intrusion sensor and in response to a movement indication from the second sensor. The base unit integrates a direction of view of the second sensor and of the image-capture device, thereby directing the second sensor to sense in the target area in which the images are captured by the image-capture device.

FIG. 1A illustrates an example embodiment of an integrated security system, according to the present invention. A base unit 35 is located in the interior of a facility and integrates a motion sensor 20, a camera 25, a data processor 30, and a communication interface 15. In one implementation the motion sensor is a passive infrared (PIR) sensor, which detects infrared energy in a target area and, in connection with a processor 30, recognizes changes in infrared energy (e.g., temperature changes) to detect motion. Depending on the size of the facility, multiple base units are located throughout the facility's interior, with a control panel 45 acting as a conventional communication hub for the facility. When the base unit 35 receives an intrusion signal 10 from an intrusion sensor (via communication interface 15), the motion sensor 20 is activated. As shown in FIG. 1A, this communication interface 15 interfaces the intrusion sensor input 10 to the control panel 45. This sensor input 10 can therefore inform either the base unit 35 or the control panel 45 to arm the motion sensor 20. When unarmed, the motion sensor 20 will not be able to activate camera 25 but may still detect motion. The motion sensor 20 can detect motion in its field of view, and once the motion sensor is armed, the motion sensor is able to activate the camera 25. The motion sensor 20 and the camera 25 are positioned such that both devices have overlapping fields of detection. Thus, images of the source of the detected motion are recorded by the camera without requiring any intervening adjustment or alignment. The recorded images are processed by a data processor 30, which can be integrated with the motion sensor 20 and the camera 25 in a base unit 35 as shown, or may be located remotely and electrically coupled to the base unit 35.

It will be appreciated that the data processor 30 can be implemented, for example, in the form of a high-speed processor such as a DSP (including an ALU) and/or a more general-purpose processor that may be optionally programmed for video data (de)compression. Thus, various embodiments may include a variety of combinations of processing operations with one or more aspects of the processing operations performed at one or more local or remote processors. For example, both video data storage and compression may be performed in the base unit 35 by the data processor 30. When the processor is located remotely, the data storage may still occur in base unit 35, but compression of the video data could be implemented in the remote processor. Another embodiment may involve data storage in the base unit 35 without any compression of the video data. Moreover, each of the above operations may be performed in combination with a central processor 55, as further discussed below.

In example implementations the base unit 35 is a battery-operated, wireless device having both motion sensing and image-capture capabilities. For further information on such a device, reference may be made to concurrently filed provisional application Ser. No. 60/785,570 filed on Mar. 24, 2006, entitled "Motion-Image Monitoring Method and Device" , which is herein fully incorporated by reference. In certain implementations, data processor 30 is configured to preserve battery life by communicating in accordance with appropriate power-saving protocols. For example implementations related to communicative coupling and data transfer among the above-discussed devices in accordance with appropriate protocols, reference may be made to U.S. application Ser. No. 11/389,673 filed on Mar. 24, 2006, entitled "Spread Spectrum Communications for Building-Security Systems" and European Patent Application Publication No. EP 1 363 260 filed on May 6, 2003, entitled "Procédé de communication radiofréquence entre plusieurs dispositifs et système de surveillance mettant en ceuvre un tel procédé," which are herein fully incorporated by reference. The power-saving approaches also provide for limited activation of the above-discussed camera such that the privacy of the inhabitants of a residence or facility is largely maintained.

The recorded images are transmitted over a bi-directional sensor communication path 40 to a control panel 45. In one implementation, the sensor communication path 40 is wireless and can be employed, e.g., as described in the above two incorporated patent documents. The transmitted images may be encrypted by the data processor 30 before being transmitted to the control panel 45. The control panel 45 includes a local storage area for the recorded images 50, the central processing unit 55, and a transceiver 60. The control panel 45 is located within the same facility as the base unit 35. The central processor 55 receives images from each of the base units located within the facility. Similar to the above discussion, the central processor 55 may perform a variety of processing operations alone or in combination with data processor 30. The images may optionally be stored in data storage 50 for further review or processing. The control panel 45 includes a battery backup power source 65 in the event of a loss of power, e.g., a natural disaster or an intruder disables power to the facility. The transceiver 60 further transmits signals including system status reports or recorded images via a telephone channel 70 or cable channel 75 to outside monitoring facilities. The telephone channel 70 and cable channel 75 are not limited to PSTN or broadband channels; they may be part of a GSM/CDMA network. Outside monitoring facilities may include a private security company or a local law enforcement station.

In another example embodiment, when an intrusion sensor senses an intruder breaching the facility (e.g., door/window contact is tripped), the intrusion signal 10 is transmitted directly to the control panel 45. The control panel 45 arms one or more base units 35 in the same zone as where the intrusion signal 10 originated. The base unit(s) 35 respond as discussed above. In this system architecture, the control panel 45 is the master and the sensors and control devices (e.g., keypads, keyfobs) are slave devices. The radio link in this architecture is a star topology with the control panel 45 at the center of the network. The branches include base units 35 and external links, e.g., telephone channel 70 and broadband channel 75.

Other aspects of the present invention are applicable to a security system where a second sensor and image-capture device are not physically integrated inside the same housing. In one such example, an embodiment is arranged with an intrusion sensor to sense an intrusion at a target area of a facility, a second sensor to sense movement, and an image-capture device. The second sensor bears a special relationship (e.g., located sufficiently near and aligned) with the image-capture device to form a common field of view, such that the fields of view for both devices overlap without the devices being located inside a common housing. The image-capture device captures images in response to an intrusion indication from the intrusion sensor and in response to a movement indication from the second sensor.

In more specific embodiments, the various arrangements permit the devices to be situated in different ways to provide the common field of view. For example, horizontal movement, vertical movement, or horizontal and vertical movement can be provided for each of the motion sensor and the image-capture device, with their movements mirrored to maintain the integrated field of view. More particularly, such mirrored movement can be provided by using a ratchet-like mechanism with devices to provide increment adjustments in the horizontal and/or vertical directions; the skilled artisan would appreciate that such adjustment can be implemented using servo-control motors or be manually implemented using conventional position-stabilizers that permit step-wise/incremental rotation.

In a related embodiment, horizontal movement, vertical movement, or horizontal and vertical movement can be provided for either or both the motion sensor and the image-capture device by way of conventional electronically-implemented pan/tilt/zoom operation(s) but with their movements coordinated to maintain the integrated field of view. For image-capture, such pan/tilt/zoom operation is commonly used in digital video-recording devices. The motion detector may also be manipulated to alter the field of view.

In more specific embodiments, the various arrangements can be implemented with a spatial relationship between the motion sensor and the image-capture device by using a common backplate to which each of the motion sensor and the image-capture device are mounted and/or a template for aligning the motion sensor and the image-capture device for mounting on a wall, where contoured portions of the respective backs of the motion sensor and the image-capture device may provide an offset for biasing the direction of view.

In other specific embodiments, the various arrangements permit for such above-described devices to be situated such that their movement is pre-set before they are used or dynamically controlled while in use with automated or semi-automated coordination provided by the control circuitry and/or personnel at a remote-site center. Such coordinated movement, while maintaining a common field of view, benefits a variety of monitoring and/or security applications.

Figure 1B:
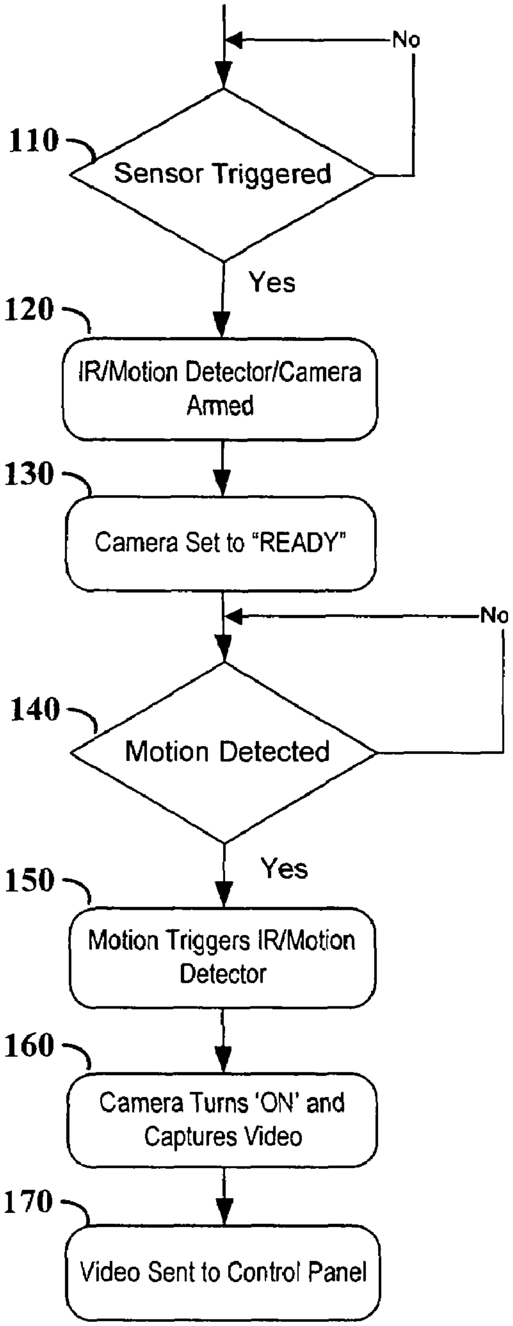
FIG. 1B is a flow diagram of how an integrated security system detects an intruder, according to an example embodiment of the present invention.

FIG. 1B illustrates a process for detecting an intruder, according to an example embodiment of the present invention. The process shown in FIG. 1B may be implemented, for example, using a security system such as that shown in FIG. 1A or otherwise described herein. An intrusion sensor, such as a window or door contact, located at a perimeter of a facility detects whether the contact subject, window or door, has been breached 110. If, for example, a window has been opened, the window contact (intrusion sensor) sends a signal to a corresponding integrated motion sensor/camera located at the interior of the facility. Upon receipt of the intrusion signal, the motion sensor is activated 120 and the integrated camera is set to a "ready" mode without initiating recording 130. The motion detector remains activated 140 and when motion is detected, the integrated motion sensor/camera is again triggered 150. Once motion is detected, the camera turns "on" and captures images of the source of the motion 160. The video images are sent to a central control panel for further evaluation 170. Further evaluation may include determining (manually or automatically using, e.g., machine visions) whether the source of the motion is human, an animal such as a pet, or another moving object. If the source is determined to be human, further evaluation may reveal whether any identifying images were captured, whether the human is an intruder or an inhabitant of the facility, and face recognition may be used to identify a previously unknown person intruding on the facility.

Figure 2A:
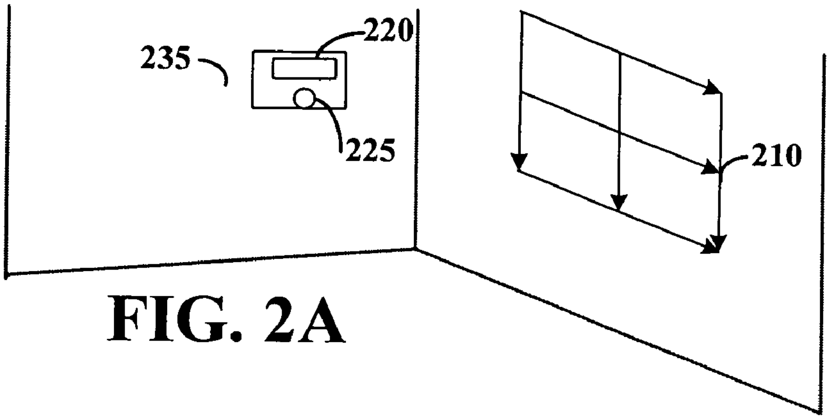
FIG. 2A is a view of an integrated security system installed in a room in a normal operating state, according to an example embodiment of the present invention.
Figure 2B:
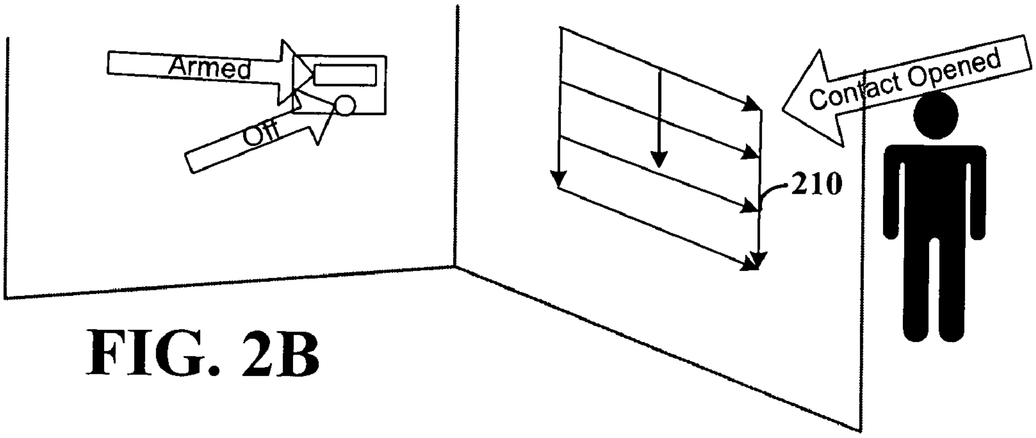
FIG. 2B is a view of an integrated security system installed in a room and responding to an intruder entering a residence, according to an example embodiment of the present invention.
Figure 2C:
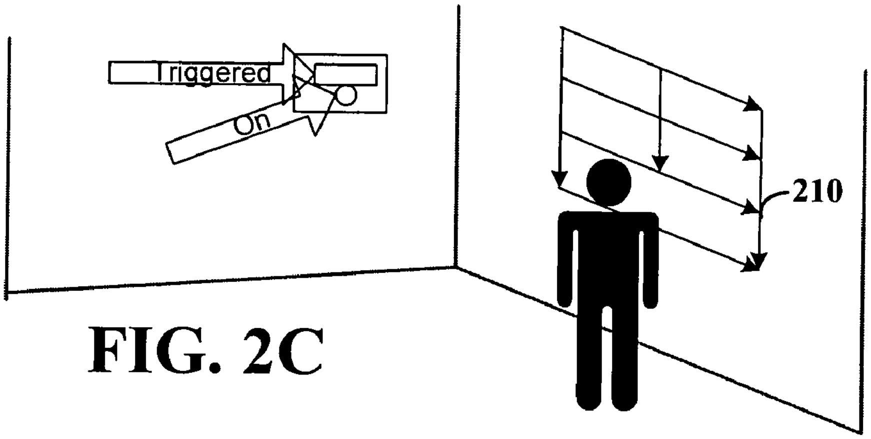
FIG. 2C is a view of an integrated security system installed in a room and responding to an intruder in the residence, according to an example embodiment of the present invention.

FIGS. 2A-C illustrate another example embodiment of a security system installed in a room. FIG. 2A shows the security system in a normal operating mode with the window contact 210 armed. In certain implementations a glass-break detector may be used as an intrusion sensor. The base unit 235, including both a motion sensor 220 and a camera 225, is located on a wall inside the bedroom. Both the motion sensor 220 and the camera 225 detect and monitor an area of the bedroom that includes the window and the bed. FIG. 2B illustrates the entrance of an intruder into the bedroom. For example, when the window is opened, the window contact 210 senses the breach of the facility and signals the base unit 235. In response to the signal, the motion sensor 220 is armed while the camera remains inactivated. FIG. 2C illustrates the intruder approaching the bed and the security system recording the unwanted activity as it occurs. The motion detector 220 detects the intruder walking toward the bed which triggers the camera to turn "on" and begin recording the intruder's movements. In one embodiment the security system may sound an alarm to scare the intruder into halting the unwanted activity. In other embodiments an alarm may be delayed until the recorded images are evaluated to verify that the intruder is an unwanted assailant and not a false alarm, e.g., a pet, or an inhabitant sneaking into the residence after curfew.

Figure 3:
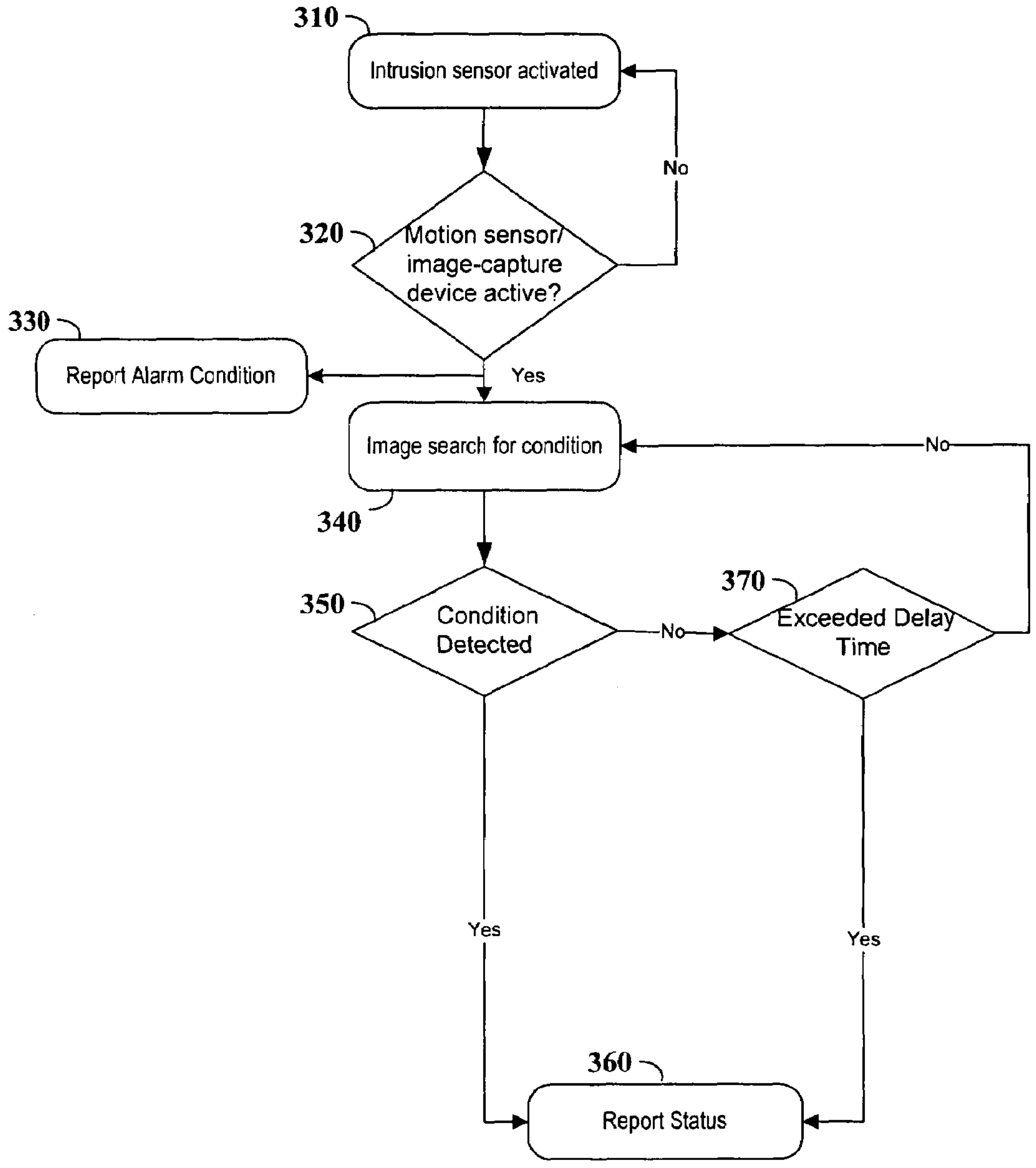
FIG. 3 is a flow diagram of generating a security system status report, according to an example embodiment of the present invention.

FIG. 3 illustrates an approach to processing recorded images in a security system, according to another embodiment of the present invention. An intrusion sensor is activated at block 310 when an intruder breaches the perimeter of a facility. If a motion sensor/image-capture device detects motion at block 320, an alarm condition is reported at block 330 and an image search is initiated at block 340. The alarm condition may be transmitted to, for example, a central control panel, a law enforcement agency, a private security monitoring facility, a cell phone, or a personal computer.

With the image search at block 340 the motion sensor/image-capture device generates video data. The video data is processed at block 350 to evaluate whether the source of the motion is captured in the video data and whether the source of the motion can be identified. For example, if the source is a false trigger such as a pet or authorized employee/inhabitant that was locked out, the system can identify the false trigger and cease further security or alarm activities. If the intruder is recorded, a status report is transmitted to the appropriate authorities at block 360. If the intruder is not detectable, the system determines whether a predetermined amount of time has been exceeded at block 370. If the video data searching has not exceeded the predetermined time delay, the system continues searching the data for images of the intruder. However, if the predetermined time delay has been exceeded, a status report is transmitted and other means are optionally implemented to identify and apprehend the intruder, such as by sounding an alarm and/or alerting authorities or other security personnel.

In another embodiment, the motion detectors, while always powered, are also always in a state of motion sensing. Thus, if motion is detected shortly before an intrusion signal is transmitted, the control panel and/or base unit can recognize the chain of events as an authorized person within the monitored zone merely opening a window or door. This aspect is also advantageous as a "privacy" feature insofar as maintaining the image sensor in a disabled mode; images of the authorized person within the monitored zone would not be captured when the window is opened. The system is programmed to recognize alternate orders of signal transmission as corresponding to permitted behavior, thereby reducing the potential for the security system creating, and responding to, a false alarm.

In another example embodiment, the home entry intrusion sensor (e.g., front door contact) corresponds to a delayed-response motion sensor such that the transmission of the motion indication is delayed to accommodate a security system control keypad located near the entrance. In another zone located nearby, such as a kitchen, the motion indication is not delayed when motion is detected. The system recognizes that motion sensed in the nearby room (e.g., person setting grocery bags down in the kitchen) following a delayed sensing of motion in the entry zone is likely an authorized user and an alarm will not sound for a predetermined length of time. If the system is not deactivated or reset before the predetermined length of time expires, the alarm will sound. The number of nearby zones configured with such a relationship with the delayed motion indication in the entry zone should be limited to ensure that an actual intruder is not provided enough time to traverse the premises without being detected.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. An integrated security arrangement, comprising:

an intrusion sensor to sense an intrusion at a target area of a facility;

a self-powered detection device including:

a second sensor to sense movement;

a non-Alternating Current (AC) power source;

an image-capture device to capture images in response to an intrusion indication from the intrusion sensor and to a movement indication from the second sensor;

an electronic circuit to control power drawn from the non-AC power source by the second sensor and the image-capture device, the electronic circuit, in response to receiving an intrusion indication from the intrusion sensor, increasing power drawn from the second sensor by arming the second sensor and, in response to receiving a movement indication from the second sensor, increasing the power drawn from the image-capture device by arming the image-capture device; and a base unit, powered by the non-AC power source, integrating the electronic circuit, the non-AC power source second sensor and the image-capture device, and directing the second sensor to sense in the target area in which the images are captured by the image-capture device.

2. The integrated security arrangement of claim 1, wherein the intrusion sensor generates a signal that arms the second sensor in response to sensing the intrusion, and wherein the non-AC power source is a battery circuit.

3. The integrated security arrangement of claim 1, wherein, the electronic circuit processes the captured images and wherein the control of power drawn from the non-AC power source by the second sensor and the image-capture device includes powering up and down portions of the image-capture device and the second sensor.

4. The integrated security arrangement of claim 3, further including a wall-mountable housing to contain the base unit, the non-AC power source, the electronic circuit, the second sensor and the image-capture device.

5. The integrated security arrangement of claim 1, further including a housing to contain the base unit, the second sensor, and the image-capture device.

6. The integrated security arrangement of claim 1, further including a communication device to transmit wireless signals to a remotely-located central controller, and a housing to contain the communication device, the base unit, the second sensor, and the image-capture device.

7. The integrated security arrangement of claim 1, wherein the second sensor is a passive infrared sensor.

8. The integrated security arrangement of claim 1, wherein one of the second sensor and the image-capture device differentiates between images of a human and another moving object.

9. The integrated security arrangement of claim 1, wherein the intrusion sensor is one of a window contact and glass-break detector.

10. The integrated security arrangement of claim 6, wherein the remotely-located central controller is located within the facility.

11. The integrated security arrangement of claim 1, wherein the second sensor is a radar detector.

12. The integrated security arrangement of claim 1, wherein the image-capture device is adapted to capture images in a range of the target area that is larger than a range of the target area in which the second sensor is adapted to sense movement.

13. The integrated security arrangement of claim 1, wherein the second sensor is adapted to sense movement in a range of the target area that is above a predetermined height and the image-capture device is adapted to capture images in a range of the target area that is larger than the range of the second sensor.

14. The integrated security arrangement of claim 1, wherein the intrusion sensor generates a signal and transmits the intrusion signal to a remotely-located central controller that arms the second sensor in response to receiving the intrusion signal.

15. The integrated security arrangement of claim 1, wherein the non-AC power source includes at least one battery, wherein the intrusion sensor generates a signal and transmits the intrusion signal to a remotely-located central controller that arms the second sensor in response to receiving the intrusion signal, wherein receipt of the movement indication is delayed for a predetermined amount of time after sensing movement and wherein the electronic circuit controls power drawn from the non-AC power source by a transmission circuit using the delay.

16. An integrated security arrangement, comprising:

intrusion means for sensing an intrusion at a target area of a facility;

second means for sensing movement;

image-capture means for capturing images in response to an intrusion indication from the intrusion means and to a movement indication from the second means;

a self-contained power source means for supplying power to the second means and image-capture means;

control means to control power drawn from the power source by the second means and the image-capture means, the control means, in response to receiving an intrusion indication from the intrusion means, increasing power drawn from the second means and, in response to receiving a movement indication from the second means, increasing the power drawn from the image-capture means; and means for integrating the control means, a direction of view of the second means and of the image-capture means and thereby directing the second means to sense in the target area in which the images are captured by the image-capture means.

17. A method for manufacturing an integrated security apparatus that is responsive to an intrusion sensor that senses an intrusion at a target area of a facility, comprising:

providing a base unit that contains, a non-Alternating Current (AC) power source, a second sensor to sense movement, and an image-capture device to capture images in response to an intrusion indication from the intrusion sensor and to a movement indication from the second sensor;

providing an electronic circuit to, arm, in response to the intrusion sensor sensing an intrusion, the second sensor to cause an increase in power consumption by the second sensor and from the non-AC power source;

arm, in response to the second sensor sensing movement, the image capture device to cause an increase in power consumption by the image captured device and from the non-AC power source, and to process the captured images; and securing the non-AC power source, the electronic circuit, the second sensor and the image-capture device to the base unit with the second sensor and the image-capture device to integrate a direction of view of the second sensor and of the image-capture device and thereby directing the second sensor to sense in the target area in which the images are captured by the image-capture device.

18. The method of claim 17, wherein, the electronic circuit is further provided to operate the second sensor to control power consumption of the second sensor and the image-capture device by disabling functionality of the second sensor and the image-capture device and to process the captured images.

19. The method of claim 17, further including providing a housing to contain the base unit, the non-AC power source, the electronic circuit, the second sensor and the image-capture device.

20. The method of claim 17, wherein the non-AC power source is a battery circuit.

21. The method of claim 17, further including providing a communication device to transmit signals to a remotely-located central controller, and providing a housing to contain the non-AC power source, the electronic circuit, the communication device, the base unit, the second sensor and the image-capture device.

22. An integrated security arrangement, comprising:

an intrusion sensor to sense an intrusion at a target area of a facility;

a second sensor to sense movement wherein the second sensor is armed for sensing in response to the intrusion sensor sensing an intrusion;

an image-capture device to capture images in response to a movement indication from the second sensor;

a non-Alternating Current (AC) power source;

a control circuit for controlling power drawn from the non-AC power source by the second sensor and the image-capture device in response to an intrusion indication from the intrusion sensor and a movement indication from the second sensor, respectively; and a base unit integrating the control circuit, a direction of view of the second sensor and of the image-capture device and thereby directing the second sensor to sense in the target area in which the images are captured by the image-capture device.

* * * * *